United States Patent [19]

Sierra, Jr.

[11] 4,031,007

[45] June 21, 1977

[54] SLOP OIL TREATING SYSTEM

[75] Inventor: Austin V. Sierra, Jr., Sulfur, La.

[73] Assignee: Cities Service Company, Tulsa, Okla.

[22] Filed: Aug. 16, 1976

[21] Appl. No.: 714,468

[52] U.S. Cl. .................................. 210/59; 210/83; 210/86; 210/96 R; 210/104; 210/DIG. 5; 204/190

[51] Int. Cl.² .................. B01D 17/04; B01D 17/06

[58] Field of Search ............. 210/23 R, 83, 84, 86, 210/96, 104, 59, DIG. 5; 204/13 C, 188, 190

[56] References Cited

UNITED STATES PATENTS

| | | | |
|---|---|---|---|
| 2,377,565 | 6/1945 | McDonald | 210/23 R |
| 2,797,284 | 6/1957 | Brooke | 210/86 |
| 2,984,360 | 5/1961 | Smith | 210/104 |
| 3,253,711 | 5/1966 | Young | 210/96 X |
| 3,565,252 | 2/1971 | Sheehy et al. | 210/104 |
| 3,574,085 | 4/1971 | Woelflin | 204/188 |

*Primary Examiner*—John Adee
*Attorney, Agent, or Firm*—George L. Rushton

[57] ABSTRACT

A conductive interface forms between the oil and water layers in a coalescer apparatus for treating slop oil. The presence of this interface is detected by (a) a capacitance probe and (b) extensions on the coalescer plates. Changes in the feed and discharge rates can then be made, assuring continuous operation.

3 Claims, 1 Drawing Figure

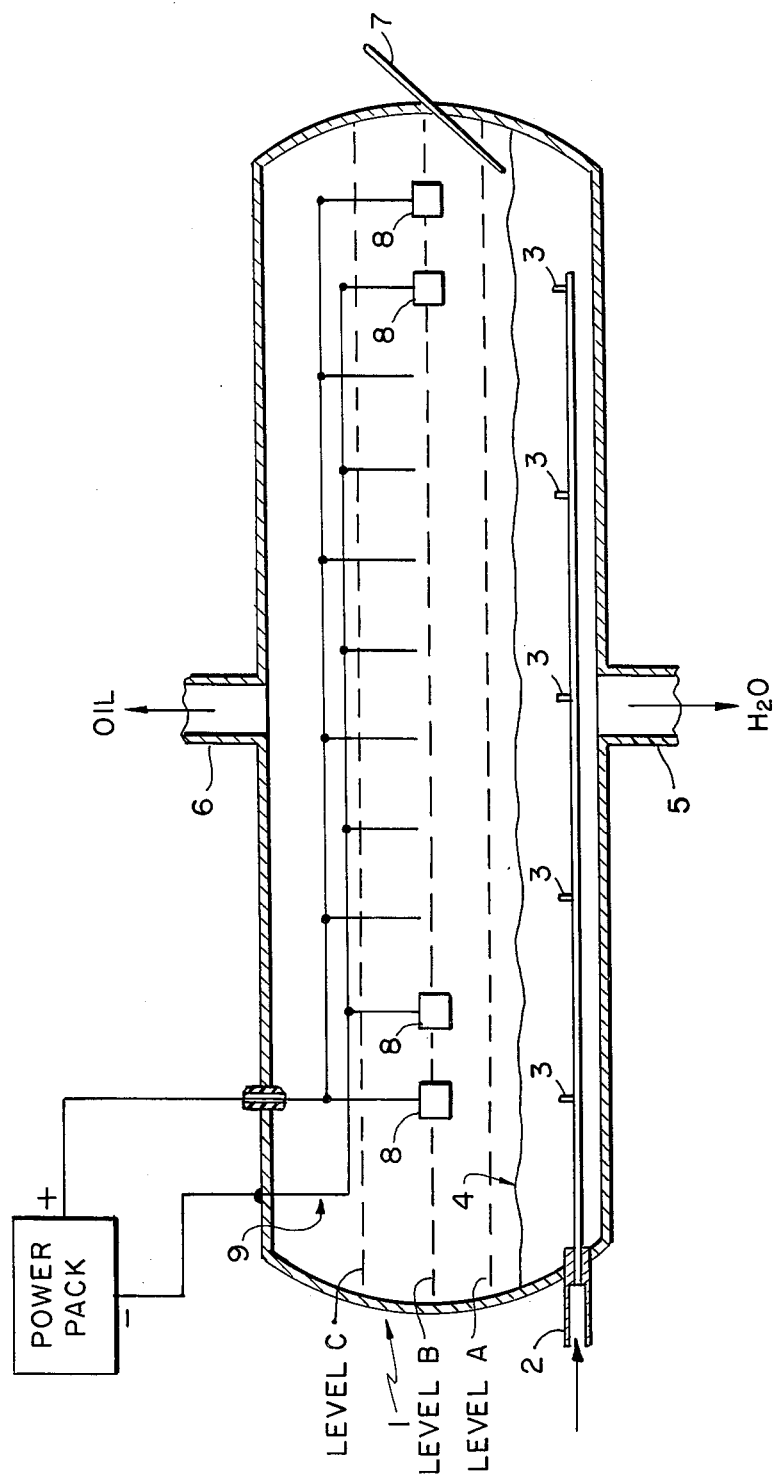

SLOP OIL TREATING SYSTEM

BACKGROUND OF THE INVENTION

This invention concerns a process for treating slop oil. More particularly, the invention concerns a method of treating slop oil in an electric coalescer apparatus. The invention also concerns a method for operating an electric coalescer that has interface problems. The utility of the invention resides in the reclamation and re-use of oily wastes, such as are found in a petroleum refinery.

Slop oil treatment is most typically found in a petroleum refinery, but the present invention can also be applied in the treatment of used railroad oil or in the recovery of cutting oils used in a steel plant. One way of treating such oily wastes is by gravity separation, wherein the oil-water mixture or emulsion is fed to a container, the oily and watery phases are allowed to separate, and the separated layers are removed. Since this method frequently requires a relatively long time and many containers having large volumes, electric coalescers are frequently used. A typical procedure is to add the slop oil-water mixture to the coalescer, along with emulsion-breaking chemicals. Under the influence of the direct current electric field in the coalescer, the emulsion breaks, giving an oily top layer and an aqueous bottom layer. The main source of trouble in a coalescer is the interface emulsion between the layers of oil and water, the most difficult portion of the mixture to treat.

If this interface emulsion level rises in the coalescer until it touches the coalescer plates, the interface, being conductive, tends to arc and short out the electrical system. Also, the emulsion through which the arc passes tends to separate, with the oily portion attaching itself to the coalescer plates. This results in a contaminating, non-conducting layer on the coalescer plates, necessitating a shutdown and cleaning of the coalescer.

In typical, prior art coalescers, this interface level was non-detectable and needed to be kept away from the coalescer plates.

SUMMARY OF THE INVENTION

I believe that I have overcome the disadvantages of the prior art by an improvement in the coalescer which comprises:

a. employing a probe that produces a signal when the interface between the oil and water layers approaches a pre-determined level in the coalescer, and b. employing vertically-placed extensions on the bottoms of at least two of the coalescer plates.

The probe is used to detect and warn of the troublesome interface emulsion. The plate extensions are used as additional warning devices, so that operating conditions in the coalescer can be altered to move the level of the troublesome interface emulsion away from the coalescer plates. The combination of these two devices allows continuous operation of the slop oil treatment system.

DESCRIPTION OF THE DRAWING

The drawing shows one embodiment of a typical electric coalescer using the improvement of this invention.

DETAILED DESCRIPTION OF THE INVENTION

Electric coalescer systems are frequently used for the treatment of slop oil streams in petroleum refineries, but they can also be used in other industries where waste oil streams, especially those involving emulsions, are encountered. The coalescing vessel is a pressure vessel. Structurally, this indicates a cylindrical vessel, preferably with the long axis in a horizontal plane. The treatment vessel will have an inlet, outlets for each of the oil and aqueous streams and accommodations for the electric coalescer plates. Broadly, the pressure used inside the vessel can vary from about 15 to about 100 psig, but it is preferably carried out at about 30 to 50 psig.

The operation of a coalescer is well known in the prior art and need not be discussed here. Each installation, depending upon operating conditions, will have its own number and arrangements of plates, location of inlet and outlets, and electrical connections. Coalescers can operate in the range of from about 100 volts to about 30 kilovolts, with the best operating conditions determined by the feed stream. I have found that one embodiment of the invention operates well in the range of 3,000–10,000 volts.

To assist in breaking up the emulsion in the slop oil feed stream, it is advisable to heat the stream. Depending upon the characteristics of the feed stream, the incoming temperature can range from about 100° to about 300° F., preferably from about 150° to about 250° F., and most preferably from about 180° to about 210° F.

The feed rate is dependent on the size of the vessel, the amount of feed supply, and the throughput desired.

In addition to the use of heat and electricity, emulsion breaking chemicals, such as polyelectrolytes, and wetting agents are used. Here again, depending upon the characteristics of the feed stream, the amounts of the demulsifiers and wetting agents can range from about 100 to about 1000 ppm each, preferably from about 300 to about 500 ppm each.

Although most slop oil streams do contain some free water, the typical composition is an emulsion of oil and water, with contaminants. Under certain conditions, the oil stream may contain only a small amount of water, possibly not enough to dissolve and react with the demulsifiers and wetting agents to promote good separation. In this invention, I prefer to add water to the feed stream, to insure a watery emulsion and to furnish a two-phase (oil and water) system in the coalescer, insuring an aqueous phase to carry off the separated contaminants. Broadly, from about 5 to about 30 vol. % water is added, based on the volume of the slop oil feed stream. A preferred range of water to be added varies from about 8 to about 20 vol. %, while the most preferred amount is about 10 vol. %.

The residence time of the slop oil in th coalescer can vary, depending upon coalescer design, composition of the feed stream, and the operating parameters. The minimum residence time is that time needed to give good phase separation, so that the effluent oil portion contains a minimum of water. If the effluent oil stream is used as feed to a coking unit, it is desirable that the oil be practically water free. The BS&W (bottom sludge and water) analysis on the oil should be less than 1%, and a value of less than 0.5% is typical.

The probe used for interface detection is one of a number of commercially-developed devices that can be used for this purpose. Although I have used and prefer an electrical capacitance probe, the type of probe used is not critical for the success of the invention, as long as it will detect the presence of the interface. One embodiment for the use of the probe is shown in the drawing, in which the probe is inserted at the widest part of the cylinder, angled downward 30° from the horizontal. Since the function of the probe is to detect the interfacial portion between the separated oil and aqueous layers, the location and placement of the probe can vary, depending upon the installation. The extensions placed on some of the coalescer plates are used as an emulsion rise warning system. The extensions are placed in vertical fashion on the bottoms of at least two of the plates, such as one positively-charged and one negatively-charged plate. These extensions are preferably formed from the same metal as is found in the coalescer plates. The size and shape of the extensions is not critical. They should be large enough to give adequate warning before the interface layer rises to the coalescer plates. As shown in the drawing, I have used a 12 inches × 12 inches extension plate fastened to the mid-bottom of two of the coalescer plates. Naturally, coalescing systems having a different design can use extension plates of a different size and shape.

Referring to the drawing, coalescer tank 1 has an inlet 2, with inlet distributors 3, a watery waste outlet 5, an oil outlet 6, a probe 7, and the electric coalescer network 9. The network comprises coalescer plates, said plates alternately connected to the + and − terminals of the direct current voltage system. At least one each of the positively-and negatively-charged plates has a vertically-placed extension plate.

In operation, the slop oil feed, heated and containing chemical additives such as demulsifiers and wetting agents, and containing at least a minimum amount of water, enters tank 1 through inlet pipe 2. The heated slop oil mixture flows through distributor 3 into the tank, where the lighter oil layer rises to the top and the aqueous layer remains in the bottom of the tank. Between the two layers is the interface, having a variable thickness. The interface level 4 shown in the drawing is at a position so that the probe is not activated. Due to changing conditions, the interface level can move upwardly to dotted level A, at which time the probe is activated and emits a signal. If the relative rates of feed and discharge flow are not changed, the interface level can rise to dotted level B. At this time, the conductive interface allows current to flow between the two extension plates 8, with this current flow offering an additional warning signal. If feed and flow rates are not changed, the interface level can rise to level C, with the aforementioned problem of arcing and shorting out. Typically, due to the warning signal from the probe or the extension plates, the inlet feed is reduced and the outlet water stream flow is increased until traces of oil are noted in the water effluent. Then the slop oil inlet feed stream and water outlet stream are adjusted to near the previous values. The above procedure offers a continuous process for treating a slop oil stream.

In a typical refinery, waste streams containing oil are collected from various units and areas and fed to a slop oil tank. Here, a gross separation ia made, giving an upper oily phase and a lower aqueous phase. The lower phase may be fed to the sewer or processed further, to reduce any small amount of oil carryover. The upper phase is mostly oil, with traces of water and solid particles. In the following example, "oil in" is the feed to the coalescer from the upper phase of the slop oil tank. The BS&W analysis (ASTM D-96) concerns the bottom sludge and water dissolved or emulsified or absorbed in the oily layer. And a similar analysis is carried out on the oil product from the coalescer. The weight of solids in the oil streams is obtained by a variation of the BS&W test, involving dilution of the oil stream by a solvent and filtration through a micropore filter, thus obtaining a weight of total undissolved solids, some of which might not be measured in the centrifugal separation procedure of ASTM D-96.

In one embodiment of the invention and using a modified 20ft. long cylindrical vessel, 10ft. in diameter, with a Drexelbrook capacitance probe No. 700-6–14 w (12 inch active length), a nominal flow of 3000 bpd from the slop oil tank was treated. Demulsifiers and wetting agents (400 ppm of each), plus 8 vol. % fresh water, were added to the slop oil feed stream, and the mixture was heated to 190° F. The heated mixture was then fed to the coalescer.

The variability of the stream from the slop oil tank and the efficacy of the improved coalescer are shown by the results from two different months:

| Month "A" | BS&W | Lbs. Solids/1000 bbl |
| --- | --- | --- |
| Oil in | 0.6% | 250.7 |
| Oil out | 0.3% | 139.9 |
| Month "B" | | |
| Oil in | 0.3% | 203.8 |
| Oil out | 0.2% | 77.8 |

But the major change in the process was the fact that the unit had a continuous run of 9 months. Previous operations on the coalescer were frequently interrupted by "short outs" of the coalescer, followed by downtime while the unit was cleaned.

I claim:

1. A method of treating slop oil in an electric coalescer apparatus, in which the oil-water emulsion feed is treated with chemicals, the mixture is fed to the coalescer, and the emulsion mixture is broken by direct electric current to give oil and water layers, wherein the improvement comprises:
    a. employing a probe that produces a signal when the interface between the oil and water layers approaches a pre-determined level in the coalescer, and
    b. employing vertically-placed extensions on the bottoms of at least two of the coalescer plates, said extensions acting as a warning device, said improvement offering a continuous method of treatment.

2. The method of claim 1, wherein the probe is an electrical capacitance probe.

3. The method of claim 1, wherein the slop oil feed to the coalescer is mixed with water to insure a two-phase system in the coalescer.

* * * * *